United States Patent Office 3,462,487
Patented Aug. 19, 1969

3,462,487
CHEMICAL COMPOUNDS AND METHODS FOR PREPARING THE SAME
Roland Walter Kinney, Trenton, Saul Lewis Neidleman, Highland Park, and Frank Lee Weisenborn and John Samuel Paul Schwarz, Somerset, N.J., assignors, by mesne assignments, to E. R. Squibb & Sons, Inc., New York, N.Y., a corporation of Delaware
No Drawing. Filed June 9, 1964, Ser. No. 373,850
Int. Cl. C07c *103/19*
U.S. Cl. 260—559                    7 Claims

ABSTRACT OF THE DISCLOSURE

Tetracycline derivatives are prepared by subjecting tetracycline, 6-demethyltetracycline or 5-hydroxytetracycline under aerobic conditions to the action of peroxidase in the presence of dihydroxyfumaric acid.

---

This invention relates to new chemical compounds and new processes for preparing chemical compounds, and, more particularly, to new tetracycline and secotetracycline derivatives and new processes for preparing such derivatives and other known tetracycline derivatives.

The new compounds of this invention include: (a) tetracycline derivatives of the Formula I:

I

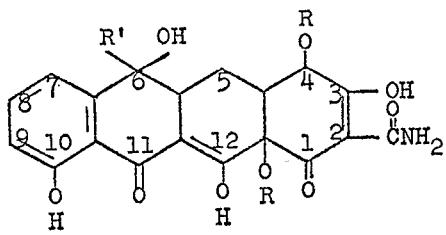

wherein the R's are the same and are each hydrogen or acyl, and R' is hydrogen or methyl; (b) lactone derivatives of secotetracyclines of the Formula II:

II

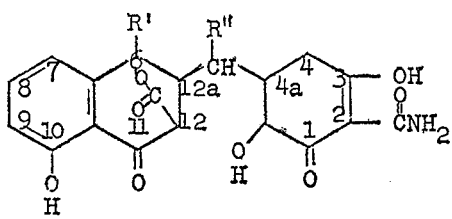

wherein R" is hydrogen or a hydroxy group, and R' is as hereinbefore defined; and (c) 4-dedimethylamino-4-keto-4a,12a-dehydro-12,12a - secotetracycline-12-oic acid 6,12-lactone of the formula III:

III

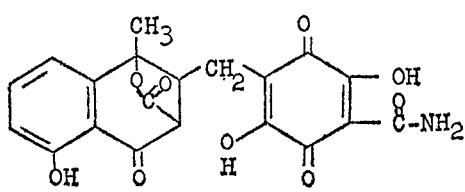

The new compounds of this invention of Formula I include: 4-hydroxy - 4 - dedimethylaminotetracycline, 4-hydroxy-4-dedimethylamino-6-demethyltetracycline, and the 4,12a-diesters thereof, especially the diesters thereof with hydrocarbon carboxylic acids of less than twelve carbon atoms, as exemplified by the lower alkanoic acids (e.g., acetic, propionic, butyric and enanthic acid), the monocyclic aryl (lower alkanoic) acids (e.g., phenylacetic acid and β-phenylpropionic acid), the monocyclic aryl carboxylic acids (e.g., benzoic acid and p-toluic acid), the lower alkenoic acids, the lower alkynoic acids, the cycloalkanecarboxylic acids and the cycloalkene carboxylic acids.

The new compounds of this invention of Formula II include: 4-dedimethylamino-12,12a-secotetracycline-12-oic acid 6,12-lactone, 4-dedimethylamino-5-hydroxy-12,12a-secotetracycline-12-oic acid 6,12-lactone and 4-dedimethylamino-6-demethyl-12,12a-secotetracycline-12-oic acid 6, 12-lactone.

Those new compounds of this invention of the Formula I are therapeutically active compounds which possess broad spectrum antibacterial activity against many gram-positive and gram-negative bacteria. Thus, the compounds of this invention can be administered perorally in the same manner as tetracycline in the treatment of bacterial diseases which respond to tetracycline treatment. In addition, the compounds of this invention display a high degree of activity against tetracycline-resistant microorganisms such as certain strains of *Staphylococcus aureus*, and hence are compounds of choice in treatment of diseases caused by such microorganisms.

Those new compounds of this invention of the Formula II and 4-dedimethylamino-4-keto-4a,12a-dehydro-12,12a-secotetracycline-12-oic acid 6,12-lactone possess strong ultraviolet absorption properties, and so are ideally suited for use in sunburn preventive preparations, such as creams, lotions or oils, which are intended for topical application to filter out the ultraviolet radiation of natural sunlight. In addition, the new compound of this invention, 4 - dedimethylamino-4-keto-4a,12a-dehydro-12,12a-secotetracycline-12-oic acid 6,12-lactone, is a strongly colored compound when viewed microscopically, possessing a dark, mustard-yellow color, and can therefore be used as a pigment for incorporation, together with a suitable vehicle such as linseed oil, for example, into artist's paints and colors.

The new compounds of this invention are prepared by the process of this invention which comprises subjecting tetracycline, 5-hydroxytetracycline or 6-demethyltetracycline under aerobic conditions to the action of the enzyme peroxidase in the presence of dihydroxyfumaric acid. The nature of the products formed will depend on the conditions under which the reaction is conducted, as more fully described hereinafter.

As sources of the peroxidase enzyme, plant cells and saps, animal tissues (such as liver), body fluids (such as saliva), leucocytes (myeloperoxidase), milk (lactoperoxidase) and many microorganisms may be used. The preferred sources of peroxidase for the purpose of this invention are horseradish and the microorganism, *Myrothecium verrucaria*. The peroxidase obtained from horseradish can be supplied merely by pressing horseradish and using the juice obtained or a purified preparation of horseradish peroxidase may be used. The peroxidase from *M. verrucaria* can be obtained by culturing the microorganism on a suitable nutrient medium, recovering the mycelium formed and treating the mycelium to recover purified peroxidase.

In addition to the peroxidase, dihydroxyfumaric acid is also added to the reaction mixture. Although substantially any concentration of this compound may be used, preferably the dihydroxyfumaric acid is present in a molar ratio of about 68 to 1 to about 1030 to 1 (optimally about 480 to 1 to about 680 to 1) based on the weight of the tetracycline antibiotic. The reaction is preferably conducted at a pH in the range of about 3 to about 8 (optimally about 4.0 to about 6.0 and most advantageously at a pH of about 4.5). To assure that the pH of the reaction mixture is maintained in this range, a buffering agent which buffers in the desired pH range is preferably also added to the reaction medium. Suitable buffers include McIlvaine's buffer, potassium citrate buffer, potassium acetate buffer, potassium phosphate buffer and potassium formate buffer.

The reaction is carried out in an aqueous medium under aerobic conditions, normally at a temperature in the range of about 15° C. to about 95° C. (optimally about 22° C. to about 37° C.). The components of the medium, namely, the tetracycline, 5-hydroxytetracycline or 6-demethyltetracycline, buffering agent, peroxidase and dihydroxyfumaric acid (preferably after adjustment of pH to the desired pH of the reaction medium, as by treatment with a base, such as potassium hydroxide) are merely mixed with water and the resultant mixture agitated or shaken to assure adequate aeration for about 10 to about 240 minutes (optimally about 30 minutes to about 120 minutes).

Although the peroxidase acts merely as a catalyst and hence can be present in any proportion, to assure maximum conversion of the starting tetracycline to the desired final products, the peroxidase is preset in a weight ratio of about 0.1 to about 1.0 (optimally about 1.0) based on the tetracycline reactant.

A mixture of products is formed during the reaction which can be separated chromatographically as more fully described in the examples following. Among these products, the following are formed if tetracycline is employed as the tetracycline reactant: the known compounds 4-dedimethylaminotetracycline, 5a,6-anhydrotetracycline, 5a,6-anhydro-4-dedimethylaminotetracycline, 4-dedimethylamino-9-hydroxytetracycline, and the new compounds: 4-dedimethylamino-12,12a-secotetracycline-12-oic acid 6,12-lactone, 4-dedimethylamino-4-hydroxytetracycline, and 4-dedimethylamino-4-keto,4a,12a-dehydro - 12,12a-secotetracycline-12-oic acid 6,12-lactone. If 5-hydroxytetracycline is employed as the tetracycline reactant, the following compounds are formed: the known compound, 4-dedimethylamino-5-hydroxytetracycline and the new compound, 4-dedimethylamino-5-hydroxy-12,12a-secotetracycline-12-oic acid 6,12-lactone. If 6-demethyltetracycline is employed as the tetracycline reactant, the following compounds are formed: 4-dedimethylamino-6-demethyltetracycline, 5a,6-anhydro-6-demethyltetracycline, 5a,6-anhydro-4-dedimethylamino-6-demethyltetracycline, 4 - dedimethylamino-6-demethyl-9-hydroxytetracycline, 4 - dedimethylamino-6-demethyl-12,12a - secotetracycline-12-oic acid 6,12-lactone, and 4-dedimethylamino-6-demethyl-4-hydroxytetracycline.

The 4,12a-esters of Formula I are prepared by reacting the 4-hydroxy-4-dedimethylamino derivatives of the respective tetracyclines with an acylating agent, such as the acid anhydrides of the hydrocarbon carboxylic acids of less than twelve carbon atoms, as named hereinbefore, in a nonaqueous solution. After a suitable reaction period, the excess acid anhydride is destroyed with water in the usual way, the solid esters are filtered off, washed well with water, and dried.

4-dedimethylamino-4-keto-4a,12a-dehydro-12,12a-secotetracycline-12-oic acid 6,12-lactone and 4-hydroxy-4-dedimethylaminotetracycline can also be prepared nonenzymatically from tetracycline by treatment with a peracid, such as m-chloroperbenzoic acid, to form the former and by treatment with hydrogen peroxide to form the latter.

The following examples illustrate the invention (all temperatures being in centigrade):

EXAMPLE 1

A reaction mixture of the following composition is prepared:

| Volume (ml.) | Component | Final concentration |
|---|---|---|
| 1.0 | McIlvaine's buffer, pH 4.5 (Handbook of Chemistry and Physics, 35th ed. Chem. Rubber Publ. Co., Cleveland, Ohio, page 1617). | |
| 1.0 | Tetracycline hydrochloride | 500 µg./ml. |
| 1.0 | Horse-radish peroxidase (Worthington, Grade D). | 50 µg./ml. |
| 1.0 | Distilled water | |
| 1.0 | Dihydroxyfumaric acid (adjusted to pH 4.5 with potassium hydroxide). | 10.0 mg./ml. |

The reaction is initiated by the final addition of the enzyme. The mixture is incubated in a glass tube, 25 x 100 mm., at 25° on a rotary shaker with a 2-inch displacement at 280 cycles/minute. At the end of 60 minutes, the reaction products are extracted from the aqueous solution into 1.0 ml. of ethyl acetate. The extract is analyzed by paper chromatography. Samples of 20 µl. are spotted on Whatman No. 1 paper buffered at pH 4.5 with 0.05 M potassium citrate and hydrated by dipping into an aqueous solution of 80% (v./v.) acetone and air-drying to evaporate the acetone. The chromatograms are developed descendingly with hexane:ethyl acetate, 1:1 (v./v.) at room temperature. After development the dried chromatograms are examined visually under an ultraviolet lamp (Mineralite Model SL, maximum emission at 254 mµ) to detect absorbing and fluorescing compounds. Spots are out-

TABLE

| Product | Rf | Inhibitory activity | Fluorescence before $NH_3$ | Fluorescence after $NH_3$ | Identity |
|---|---|---|---|---|---|
| A | 0.78 | + | Orange | Green | 4-dedimethylamino-tetracycline. |
| B | 0.68 | − | do | Orange | 4-dedimethylamino-12,12a-secotetracycline-12-oic acid 6,12-lactone. |
| C | 0.68 | − | Blue-green | Blue-green | ? |
| D | 0.81 | + | Orange | Red-orange | 5a,6-anhydrotetracycline. |
| E | 0.95 | + | Yellow-orange. | Orange | 5a,6-anhydro-4-dedimethylamino-tetracycline. |
| F | 0.38 | + | Orange | Green | 4-dedimethyl-amino-4-hydroxy-tetracycline. |
| G | 0.38 | − | Red | Red | 4-dedimethylamino-4-keto-4a,12a-dehydro-12,12a-secotetracycline-12-oic acid 6,12-lactone. |
| H | 0.22 | + | (Absorbing) | | 4-dedimethylamino-9-hydroxytetracycline. |
| I | 0.57 | + | Orange | Green | ? |
| J | 0.57 | − | Yellow | Orange | ? |
| K | 0.26 | − | do | Yellow | ? |
| L | 0.12 | − | Orange | Orange | ? |
| M | 0.46 | − | Dull red | Dull red | ? |
| N | 0.62 | − | Dull red-orange. | Dull red-orange. | ? |
| O | 0.85 | − | (Absorbing) | | ? | lined, the chromatogram is then exposed momentarily to ammonia vapor and re-examined under ultraviolet light. Compounds with antibacterial activity are detected by bioautography in the usual manner using an overnight culture of Staphylococcus aureus strain 209P as test organism. The reaction products and some of their properties are listed in the following table. Under "Inhibitory Activity" a plus sign (+) indicates the compound possesses antibacterial activity and a minus sign (—) indicates the compound does not possess antibacterial activity against the test organism named above.

Compound B is isolated in pure crystalline form by preparative paper chromatography, subsequent countercurrent distribution in hexane - ethylacetate-methanol-water (4:4:3:4) (K=10), and crystallization from ethanol-water.

Properties of Compound B $[\alpha]_D^{20}$: —60° (c. 0.6, methanol).

Elemental analysis: Anhydrous (calcd. from hydrate): C, 59.69; H, 4.66; N, 3.39; $C_{20}H_{19}O_8N$: C, 59.85; H, 4.77; N, 3.50.

IR (Nujol): 5.65 ($\gamma$ lactone), sh 6.03, 6.15, 6.36, 6.90 (6.90 band also present in $CHCl_3$ spectrum).

UV spectra (95% ethanol 0.1 N HCl): 217 m$\mu$ ($\epsilon$=16,600), 270 (21,700), 345 (4,600).

(Ethanolic 0.1 N NaOH): 245 (19,700), 273 (15,900), 382 (6,800).

(Above after standing 0.5–2 hrs.): 246 (22,900), 274 (18,700), 341 (7,600).

(Above after acidification): 211 (20,900), 269 (19,800).

EXAMPLE 2

The reaction is carried out as in Example 1 with the exception that the original reaction mixture has been modified to have the following composition:

| Volume (ml.) | Component | Final concentration |
|---|---|---|
| 1.0 | Potassium citrate buffer, pH 5.0 | 0.1 M |
| 1.0 | Tetracycline hydrochloride | 500 µg./ml. |
| 1.0 | Horseradish peroxidase (Worthington, Grade D). | 50 µg./ml. |
| 1.0 | Potassium or ammonium formate | 5.0 mg./ml. |
| 1.0 | Dihydroxyfumaric acid (adjusted to pH 5.0 with potassium hydroxide). | 10 mg./ml. |

The result of this modification is an alternation in the number and relative concentration of the end products which accumulate. These are shown in the following table, wherein plus signs indicate an increase in quantity of the compound in question and a minus sign indicates no increase in quantity relative to Example 1 (the same letters are used to indicate the compound as were used in the preceding table):

TABLE

| Product: | Stimulation due to added formate |
|---|---|
| A | +++ |
| B | ++++ |
| C | — |
| D | — |
| E | — |
| F | ++ |
| G | — |
| H | ++ |
| I | + |
| J | — |
| K | — |
| L | — |
| M | — |
| N | — |
| O | — |

EXAMPLE 3

The reaction is carried out as in Example 1 with the exception that the original reaction mixture has been modified to have the following composition:

| Volume (ml.) | Component | Final concentration |
|---|---|---|
| 1.0 | Potassium acetate buffer, pH 4.5 | 0.1 M |
| 1.0 | Tetracycline hydrochloride | 500 µg./ml. |
| 1.0 | Horseradish peroxidase (Worthington, Grade D). | 50 µg./ml. |
| 1.0 | Chloro-p-phenylenediamine dihydrochloride. | 100 µg./ml. |
| 1.0 | Dihydroxyfumaric acid (adjusted to pH 4.5 with potassium hydroxide). | 10 mg./ml. |

The result of this modification is an alteration of the number and relative concentration of the end products which accumulate as compared to Example 1. These are shown in the following table:

TABLE

| Product: | Stimulation due to chloro-p-phenylenediamine dihydrochloride |
|---|---|
| A | ++++ |
| B | ++ |
| C | — |
| D | — |
| E | — |
| F | — |
| G | — |
| H | +++ |
| I | +++ |
| J | — |
| K | — |
| L | — |
| M | — |
| N | — |
| O | — |

EXAMPLE 4

The reaction is carried out as in Example 3 but substituting 1.0 ml. of potassium formate, at a final concentration of 0.1 M, for the potassium acetate buffer. This buffers the reaction medium at pH 4.0. The result of this modification as compared to Example 1 is shown in the following table:

TABLE

| Product: | Stimulation due to chloro-p-phenylenediamine dihydrochloride and formate |
|---|---|
| A | ++++ |
| B | +++ |
| C | — |
| D | — |
| E | — |
| F | — |
| G | — |
| H | ++++ |
| I | +++ |
| J | — |
| K | — |
| L | — |
| M | — |
| N | — |
| O | — |

EXAMPLE 5

The reaction is carried out as described in Example 2 except that a crude press juice of fresh horseradish root is substituted for the partially purified peroxidase. Essentially the same results are obtained as were obtained in Example 2.

EXAMPLE 6

The reaction is carried out as described in Example 1 with the exception that a highly purified preparation of horseradish peroxidase is employed (Worthington Biochemical Corporation, Grade A). Essentially the same results are obtained as were obtained in Example 1.

EXAMPLE 7

To each of forty 500 ml. Erlenmeyer flasks is added 100 ml. of the following reaction mixture:

| Volume (ml.) | Component | Final concentration |
|---|---|---|
| 20 | 0.5 M potassium formate buffer pH 4.0 | 0.1 M |
| 25 | Distilled water | |
| 25 | Methanol | |
| 10 | Tetracycline hydrochloride | 500 μg./ml. |
| 10 | Dihydroxyfumaric acid (adjusted to pH 4 with KOH). | 5 mg./ml. |
| 10 | Horseradish peroxidase (Worthington, Grade D). | 50 μg./ml. |

The flasks are shaken on a rotary shaker at 25° for 60 minutes, when the reaction is essentially complete. The major products formed are 4-hydroxy-4-dedimethylaminotetracycline and 4-dedimethylamino-4-keto-4a,12a-dehydro-12,12a-secotetracycline-12-oic acid 6,12-lactone. These are separated from each other and from unreacted substrate tetracycline in the manner described below.

The contents of the flasks are pooled and extracted with 500, 250 and 250 ml. portions of ethyl acetate. The ethyl acetate extracts are combined, dried with anhydrous sodium sulfate, filtered, then evaporated to dryness at a temperature less than 35° under reduced pressure. The dry weight of the orange-brown solid thus obtained is about 1.15 grams.

This material is further purified by column chromatography as follows: 500 g. Whatman Standard Grade Cellulose Powder is slurried with McIlvaine's buffer, pH 4.6, filtered and dried. The dried, buffered powder is hydrated by wetting with 80% aqueous acetone and then aerating to remove the acetone. The moist powder is then suspended in n-hexane:ethyl acetate (2:1) and poured as a column 6.7 x 41 cm. The orange-brown solid obtained above (about 1.15 g.) is dissolved in hexane:ethyl acetate (2:1) and loaded onto the column, and elution with the same solvent is begun at the rate of 0.5 ml./min. with fractions collected every 20 minutes. Each fraction is analyzed chromatographically using Whatman No. 1 paper buffered at pH 4.6 with McIlvaine's buffer, developed with hexane:ethyl acetate (1:1). Fractions containing the products free of the unreacted substrate tetracycline are pooled, dried with anhydrous sodium sulfate, filtered, and concentrated to dryness under reduced pressure at 35°. About 258 mg. of a yellow powder is obtained. This yellow powder cannot be further purified in a satisfactory manner by chromatography, but is resolved into its two components by the following procedure.

The yellow powder is triturated with methanol to give a methanol-soluble and a methanol-insoluble fraction. The methanol-insoluble portion (41 mg.) proves to be pure 4-dedimethylamino - 4 - keto - 4a,12a - dehydro-12,12a-secotetracycline-12-oic acid 6,12-lactone, which possesses a mustard-yellow color. The methanol-soluble material is chromatographed on Whatman No. 1 paper buffered at pH 4.6 with hexane:ethyl acetate as above, the ultraviolet absorbing bands at $R_f$ ca. 0.38 are cut out and eluted with methanol. The solution is taken to dryness, and the residue is then partitioned between saturated ammonium sulfate solution and ethyl acetate. The ethyl acetate extract is dried, filtered, and taken to dryness as above. The residue is dissolved in a small volume of ethyl acetate and upon the addition of a large excess of hexane a white, amorphous powder precipitates. This product (14 mg. yield) is essentially pure 4-hydroxy-4-dedimethylaminotetracycline.

The properties of the purified compounds are listed below:

| | 4-hydroxy-4-dedimethylaminotetracycline | 4-dedimethylamino-4-keto-4a,12a-dehydro-12,12a-secotetracycline-12-oic acid 6,12-lactone |
|---|---|---|
| Physical appearance | White amorphous powder. | Mustard-yellow powder. |
| M.P. | | 225.5–227.5° decomp. |
| $[\alpha]_D^{20}$ (methanol) | | −74°±11°. |
| UV spectra ($E^{1\%}$) (alc.). | 222 (360), 268 (428), 365 (300). | 275 (543), 299 (459), sh 337 (116), 422 (12). |
| (0.1 N HCl) | Same as above (stable over 20 hr. period). | sh 244 (263), 274 (670), 295 (400), 338 (124). |
| (0.1 N NaOH) | 243 (504), 270 (405), 384 (356) (on standing over 1 hr. decomposed to products having nondescript UV spectrum). | |
| IR (KBr) | sh 6.03, 6.21, 6.35, 6.90. | |
| (Nujol) | | 2.95, 3.05, 5.62, 6.08, sh 6.17, 6.30. |

EXAMPLE 8

The reaction is carried out essentially as in Example 1 with the exception that a crude peroxidase preparation from the microorganism *Myrothecium verrucaria* ATCC 9095 (American Type Culture Collection, Washington, D.C.) is employed and the incubation temperature is 25°. The peroxidase is obtained by growing the microorganism for five days at 25° in a soybean meal-glucose medium of the following compositions:

| | G. |
|---|---|
| Archer-Daniels-Midland extracted soybean meal | 30 |
| Glucose | 50 |
| $CaCO_3$ | 7 |

Distilled water, to make 1 liter.

The mycelium is recovered by filtration, dried with anhydrous acetone in the usual manner, and ground to a fine powder. The dry powder is stored in a desiccator at about 4° until immediately before use, when it is extracted with distilled water. The solution is used as the source of the enzyme. Essentially the same results are obtained as were obtained in Example 1.

EXAMPLE 9

The reaction is carried out as in Example 8 except that the solution of the enzyme is partially purified by precipitation with ammonium sulfate. Powdered ammonium sulfate is added to the distilled water extract of the acetone powder of *M. verrucaria* to the point of 50% saturation. The protein precipitate which forms is collected by centrifugation, and is redissolved in water. This concentrated solution of protein can be used as such, or freed of residual ammonium sulfate by dialysis against water overnight at 4–6°. Essentially the same results are obtained as were obtained in Example 1.

EXAMPLE 10

The compound 4-dedimethylamino-4-keto-4a,12a-dehydro-12,12a-secotetracycline-12-oic 6,12-lactone can also be prepared by a nonenzymatic procedure as follows. Tetracycline is treated with m-chlorperbenzoic acid in dioxane at room temperature. The reaction is followed by quenching with potassium iodide solution and titration of liberated iodine with standard thiosulfate solution. It is found that 1 mole of the peracid is consumed very rapidly (12 sec. at 24.5°) and the uptake of peracid continues rapidly, gradually tapering off at 2.5 moles (90 sec.). Paper chromatographic study of the reaction over a range of peracid concentrations shows the optimum concentrations to be 1.5 moles of peracid to 1 mole of tetracycline. For preparative purposes 1.6 moles m-chlorperbenzoic acid is reacted with 1 mole tetracycline in methanol. The mixture is allowed to stand at 24.5–26° until a starch-iodide test shows all the peracid to be consumed. The methanol is removed and the red, oily residue is extracted with several portions of boiling hexane. The residue is triturated with ethyl acetate to produce a brickred powder. Isolation of the product through preparative paper chromatography and comparison with data of the product produced enzymatically shows them to be identical and establishes the identity as that of the compound named above.

EXAMPLE 11

The new compound 4-hydroxy-4-dedimethylaminotetracycline is also prepared nonenzymatically from tetracycline in the following way:

Tetracycline hydrochloride (0.5–5.0 mg./ml., optimum concentration 1–3 mg./ml.) is dissolved in 0.1 M potassium formate buffer, pH 4.0, dihydroxyfumaric acid is added as the potassium salt (10–60 mg./ml., optimum concentration 10 mg./ml.), and the reaction is initiated by the addition of a dilute solution of hydrogen peroxide (final concentration 0.03–3.0%, optimum concentration 0.03%). The reaction mixture is shaken in air at 25° until all traces of the dihydroxyfumaric acid suspension disappear and the medium clears (ca. 2 hrs.). The reaction products are then extracted into ethyl acetate, and are characterized chromatographically as described previously. The above-named compound is found to be the major product, and comparison of its physical properties determined by analysis with those of the compound produced enzymatically proves its identity.

EXAMPLE 12

4-hydroxy-4-dedimethylaminotetracycline 4,12a-diacetate

A 0.10 g. sample of 4-hydroxy-4-dedimethylaminotetracycline is treated with 1 ml. of acetic anhydride. After 14 days at a temperature of 25–30° the solution is taken to dryness in vacuo at a temperature less than 35°. The last trace of acetic anhydride is destroyed by the addition of water in the usual way, and the product is filtered, washed with water, and dried.

Similarly, if other acid anhydrides are substituted for acetic anhydride, other 4,12a-diesters are formed.

EXAMPLE 13

The reaction is carried out as in Example 1 except that 5-hydroxytetracycline is used in place of tetracycline as the substrate. The reaction products and some of their properties are listed in the following table. Under "Inhibitory Activity" a plus sign (+) indicates antibacterial activity against *Staphylococcus aureus* strain 209-P, and a minus sign (−) indicates that the compound does not possess antibacterial activity against this strain.

TABLE

| Product | Rf | Inhibitory activity | Fluorescence before $NH_3$ | Fluorescence after $NH_3$ | Identity |
|---|---|---|---|---|---|
| P | 0.72 | + | Orange | Green | 4-dedimethylamino-5-hydroxytetracycline. |
| Q | 0.56 | − | do | Orange | 4-dedimethylamino-5-hydroxy-12,12a-secotetracycline-12-oic acid 6,12-lactone. |
| R | 0.90 | + | do | Green | ? |
| S | 0.22 | + | do | Orange | ? |
| T | 0.94 | − | do | do | ? |
| U | 0.77 | − | do | do | ? |
| V | 0.32 | − | do | do | ? |

EXAMPLE 14

The reaction is carried out as in Example 1 except that 6-demethyltetracycline is used in place of tetracycline as substrate. The reaction products and some of their properties are listed in the following table. Under "Inhibitory Activity" a plus sign (+) indicates antibacterial activity against *S. aureus* 209-P, and a minus sign (−) indicates that the compound does not possess antibacterial activity against this strain.

TABLE

| Product | Rf | Inhibitory activity | Fluorescence before $NH_3$ | Fluorescence after $NH_3$ | Identity |
|---|---|---|---|---|---|
| A′ | 0.94 | + | Brown | Brown | 4-dedimethylamino-5a,6-anhydro-6-demethyltetracycline. |
| B′ | 0.89 | − | Dull rose | Dull rose | ? |
| C′ | 0.83 | + | Yellow-orange | Orange | 5a,6-anhydro-6-demethyltetracycline. |
| D′ | 0.77 | + | Yellow-green | Green | 4-dedimethylamino-6-demethyltetracycline. |
| E′ | 0.70 | − | Pink | Pink | 4-dedimethylamino-6-demethyl-12,12a-seco-tetracycline-12-oic acid 6,12-lactone. |
| F′ | 0.65 | − | Orange | Orange | ? |
| G′ | 0.59 | − | White | White | ? |
| H′ | 0.51 | + | Rose | Green | 4-hydroxy-4-dedimethylamino-6-demethyltetracycline. |
| I′ | 0.39 | − | Pink | Pink | ? |
| J′ | 0.35 | − | (Absorbing) | | ? |
| K′ | 0.31 | − | Rose | Rose | ? |
| L′ | 0.27 | + | (Absorbing) | | 4-dedimethylamino-6-demethyl-9-hydroxytetracycline. |
| M′ | 0.18 | − | White | Pink | ? |
| N′ | 0.12 | − | (Absorbing) | | ? |
| O′ | 0.09 | − | Rose | Rose | ? |

What is claimed is:

1. A process for preparing tetracyclines which comprises subjecting a compound selected from the group consisting of tetracycline, 6-demethyltetracycline and 5-hydroxytetracycline, under aerobic conditions to the action of peroxidase in the presence of dihydroxyfumaric acid.

2. A process for preparing 4-hydroxy-4-dedimethylaminotetracycline, which comprises subjecting tetracycline under aerobic conditions to the action of peroxidase in the presence of dihydroxyfumaric acid at a temperature in the range of about 15° C. to about 37° C.

3. A compound of the formula

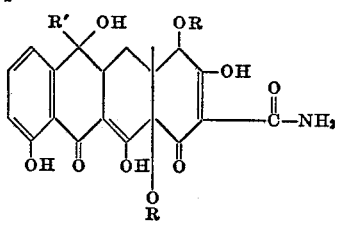

wherein each R is selected from the group consisting of hydrogen and the acyl radical of a hydrocarbon carboxylic acid of less than twelve carbon atoms, and R' is selected from the group consisting of hydrogen and methyl.

4. 4-hydroxy-4-dedimethylaminotetracycline.

5. 4 - hydroxy - 4 - dedimethylamino - 6 - demethyltetracycline.

6. The compound of claim 3, wherein both R's are acetyl and R' is methyl.

7. A process for preparing 4-hydroxy-4-dedimethylaminotetracycline which comprises treating tetracycline with dihydroxyfumaric acid and hydrogen peroxide.

References Cited

UNITED STATES PATENTS

| 3,375,276 | 3/1968 | Neidleman et al. | |
| 3,196,164 | 7/1965 | Lucas et al. | 260—343.3 |
| 3,198,810 | 8/1965 | Wygrant et al. | 260—343.3 |
| 2,812,349 | 11/1957 | Gordon | 260—490 |
| 3,021,360 | 2/1962 | Pohland | 260—590 |

ALEX MAZEL, Primary Examiner

ANNE MARIE T. TIGHE, Assistant Examiner

U.S. Cl. X.R.

106—228; 195—29; 260—343.3; 424—60, 227

Notice of Adverse Decision in Interference

In Interference No. 98,970, involving Patent No. 3,462,487, R. W. Kinney, S. L. Neidleman, F. L. Weisenborn and J. S. P. Schwarz, CHEMICAL COMPOUNDS AND METHODS FOR PREPARING THE SAME, final judgment adverse to the patentees was rendered Oct. 12, 1976, as to claim 4.

[*Official Gazette February 1, 1977.*]